US012561622B2

(12) United States Patent
Yi et al.

(10) Patent No.: US 12,561,622 B2
(45) Date of Patent: Feb. 24, 2026

(54) PREPROCESSING, LAYOUT AND PRODUCTION OPTIMIZATION METHODS FOR NESTING AND SHEAR CUTTING OF A DEFECTIVE PLATE

(71) Applicant: BAOSHAN IRON & STEEL CO., LTD., Shanghai (CN)

(72) Inventors: Jian Yi, Shanghai (CN); Limin Wang, Shanghai (CN); Shujin Jia, Shanghai (CN); Bin Du, Shanghai (CN); Liangqi Ge, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 577 days.

(21) Appl. No.: 18/010,956

(22) PCT Filed: Jun. 22, 2021

(86) PCT No.: PCT/CN2021/101552
§ 371 (c)(1),
(2) Date: Dec. 16, 2022

(87) PCT Pub. No.: WO2022/001752
PCT Pub. Date: Jan. 6, 2022

(65) Prior Publication Data
US 2023/0237391 A1     Jul. 27, 2023

(30) Foreign Application Priority Data

Jun. 29, 2020     (CN) .......................... 202010602833.0
Dec. 31, 2020     (CN) .......................... 202011636444.6

(51) Int. Cl.
*B21B 15/00*     (2006.01)
*G06Q 10/04*     (2023.01)

(52) U.S. Cl.
CPC ....... *G06Q 10/043* (2013.01); *B21B 15/0007* (2013.01)

(58) Field of Classification Search
None
See application file for complete search history.

(56) References Cited

U.S. PATENT DOCUMENTS

2006/0090319 A1 * 5/2006 Howe ................ G01N 21/8903
29/709
2011/0049781 A1 * 3/2011 Lewalski ................. B26D 9/00
271/265.01
(Continued)

FOREIGN PATENT DOCUMENTS

CN          1584888 A     2/2005
CN        103593511 A     2/2014
(Continued)

OTHER PUBLICATIONS

International Search Report for PCT/CN2021/101552 dated Sep. 17, 2021.
(Continued)

*Primary Examiner* — Ariel Mercado-Vargas
(74) *Attorney, Agent, or Firm* — Lei Fang, Esq.; Smith Tempel Blaha LLC

(57) ABSTRACT

A nesting and shear cutting preprocessing method for a defective plate, comprising the following steps: acquiring plate information of a plate, wherein the plate information includes defect information and plate dimension information; making an electronic defect map according to the defect information and the plate dimension information, and partitioning out a region available for nesting and shear cutting; and partitioning the plate to obtain small plates according to the region available for nesting and shear cutting. A nesting and shear cutting layout method for a defective plate, a nesting and shear cutting production
(Continued)

acquiring plate information of the plate, wherein the plate information includes defect information and plate dimension information ⟶ S1 making an electronic defect map based on the defect information and the plate dimension information, and partitioning out a region available for nesting and shear cutting ⟶ S2 partitioning the plate to obtain small plates according to the region available for nesting and shear cutting ⟶ S3 optimization method for a defective plate, and a system, a computing device, a storage medium therefor. The preprocessing method and the system can reduce the scrap rate of plate processing.

22 Claims, 3 Drawing Sheets

(56) References Cited

U.S. PATENT DOCUMENTS

| | | | | |
|---|---|---|---|---|
| 2013/0178953 | A1* | 7/2013 | Wersborg | B23K 26/34 |
| | | | | 700/48 |
| 2017/0113300 | A1* | 4/2017 | Lüdi | B23K 26/032 |
| 2019/0354641 | A1 | 11/2019 | Masoud et al. | |
| 2019/0377834 | A1* | 12/2019 | Gibbens | G06F 30/00 |
| 2020/0047364 | A1* | 2/2020 | Hawkins | B26D 7/0625 |
| 2021/0308787 | A1* | 10/2021 | Kiefer | G06T 7/0004 |

FOREIGN PATENT DOCUMENTS

| | | | |
|---|---|---|---|
| CN | 101097441 | A | 1/2018 |
| CN | 108764513 | A | 11/2018 |
| CN | 109614387 | A | 4/2019 |
| CN | 110216319 | A | 9/2019 |
| CN | 110288110 | A | 9/2019 |
| CN | 110570038 | A | 12/2019 |
| CN | 110598893 | A | 12/2019 |
| CN | 110991755 | A | 4/2020 |
| CN | 111275243 | A | 6/2020 |
| JP | S563121 | A | 1/1981 |
| JP | S57202998 | A | 12/1982 |
| KR | 20170002161 | A | 1/2017 |

OTHER PUBLICATIONS

International Written Opinion for PCT/CN2021/101552 dated Sep. 17, 2021.
CN First OA for CN202011636444.6 with EN translation.
CN Search Report for CN202011636444.6.
Priority documents with EN translation.

* cited by examiner

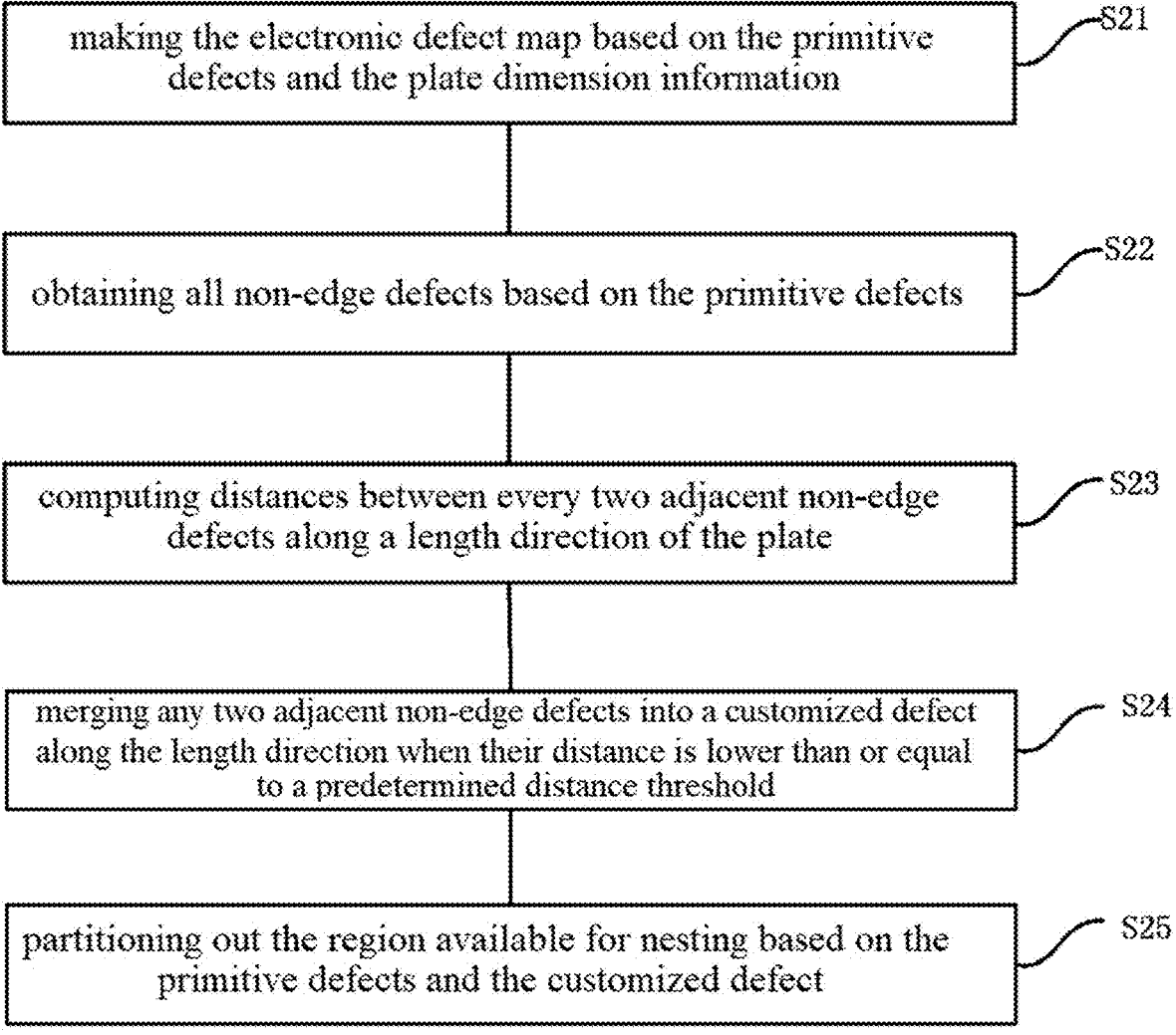

making the electronic defect map based on the primitive defects and the plate dimension information — S21 obtaining all non-edge defects based on the primitive defects — S22 computing distances between every two adjacent non-edge defects along a length direction of the plate — S23 merging any two adjacent non-edge defects into a customized defect along the length direction when their distance is lower than or equal to a predetermined distance threshold — S24 partitioning out the region available for nesting based on the primitive defects and the customized defect — S25

Fig. 3

PREPROCESSING, LAYOUT AND PRODUCTION OPTIMIZATION METHODS FOR NESTING AND SHEAR CUTTING OF A DEFECTIVE PLATE

CROSS-REFERENCE TO RELATED APPLICATIONS

This application is a 371 U.S. National Phase of PCT International Application No. PCT/CN2021/101552 filed on Jun. 22, 2021, which claims priority to a Chinese Application No. 202010602833.0 filed on Jun. 29, 2020 and a Chinese Application No. 202011636444.6 filed on Dec. 31, 2020, respectively, the contents of above all documents are incorporated by reference herein in their entireties.

TECHNICAL FIELD

The present invention relates to the technical field of plate processing, in particular to preprocessing, layout and production optimization methods for nesting and shear cutting of a defective plate.

BACKGROUND

Plate processing is an important step in the production process of plates. For example, in terms of steel plates, shear cutting, processing and delivery are important additional services provided by steel enterprises. Steel enterprises are generally built with steel processing centers. The processing centers may confront extensive customers, such as manufacturers of refrigerators, washing machines, printers, transformers and the like who need to use steel plates and have various products of different model series, which result in different specifications of desired steel plate parts. Due to the numerous specifications of the parts and different required amounts, the processing centers tend to integrate parts with different specifications from different orders on a large steel plate by combination calculation to perform shear cutting production, which is called nesting and shear cutting.

In some processing processes, the parts with different finished product widths are closely laid adjacent to each other in width direction when they are integrated, so that the width of steel plate is utilized as much as possible, and the utilization rate of the width of steel plate is called product-yield, namely: the product-yield=the sum of finished product widths/the width of steel plate. The integration mode of the parts with different finished product widths is called a layout mode. In actual production, the steel plate is cut into finished strips by assembling and installing disc blades, so a layout mode corresponds to a method how to assemble and install disc blades.

SUMMARY

The applicant studies and discovers that the prior art has a problem of high scrap rate in plate processing. The applicant further studies and finds that it is due to the various defects that possessed by the plate itself during the production process, such as folds and holes. These defects have a great influence on the quality of finished products, and due to the lack of corresponding treatment in the prior art, defective and unqualified products are produced. Such defective finished products cannot be provided to customers and have to be discarded, so that the scrap rate of plate processing is high.

The present invention aims to provide a preprocessing method, a layout method and a production optimization method for nesting and shear cutting of a defective plate, and a system, a computing device and a storage medium therefor, so as to solve the problem of high scrap rate in the plate processing process of the prior art.

In order to solve the above technical problem, one embodiment of the present invention discloses a preprocessing method for nesting and shear cutting of a defective plate, comprising the following steps: acquiring plate information of the plate, wherein the plate information includes defect information and plate dimension information; making an electronic defect map based on the defect information and the plate dimension information, and partitioning out a region available for nesting and shear cutting; and partitioning the plate to obtain small plates according to the region available for nesting and shear cutting.

Based on the above technical solution, the preprocessing method for nesting and shear cutting of a defective plate according to the present application can fully consider the influence of the defects, and partitioning out a region available for nesting and shear cutting by making the electronic defect map, so that the plate is reasonably partitioned into small plates according to the region available for nesting and shear cutting, thereby reducing the scrap rate of plate processing. Moreover, the small plates obtained by partitioning the plate based on the electronic defect map made by the digitized defect information instead of cutting the plate directly can help determine the subsequent processing solution for the plate before the production, which has high scientificity and can improve the production efficiency.

Optionally, the defect information includes that of primitive defects, and the step of making the electronic defect map based on the defect information and the plate dimension information and partitioning out the region available for nesting and shear cutting further comprises making the electronic defect map based on the primitive defects and the plate dimension information; obtaining all non-edge defects based on the primitive defects; computing distances between every two adjacent non-edge defects along the length direction of the plate; merging any two adjacent non-edge defects into a customized defect along the length direction when their distance is lower than or equal to a predetermined distance threshold; and partitioning out the region available for nesting and shear cutting based on the primitive defects and the customized defect.

Another embodiment of the present invention further discloses a layout method for nesting and shear cutting of a defective plate, comprising any one of the foregoing preprocessing methods for nesting and shear cutting of a defective plate. The layout method for nesting and shear cutting of a defective plate further comprises the following steps: acquiring specification information of each finished product for products to be processed; acquiring parameter information of each small plate; setting decision variables relating to layout modes of each small plate, and establishing the constraints among the decision variables, the specification information and the parameter information; and finding out layout modes for each small plate that satisfies the constraints.

Based on the above technical solution, the layout method for nesting and shear cutting of a defective plate can facilitate processing production of the plate.

Optionally, the specification information includes a width of finished product; and wherein the parameter information includes a width of small plate, a maximum defect width on the working side of small plate and a maximum defect width on the driving side of small plate; and wherein the decision variables include strip number of each finished product on each small plate, and the constraints include a first constraint corresponding to the width of small plate.

Optionally, the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and wherein the decision variables comprise the $x_i^j$; and wherein the first constraint comprises:

$$\sum_{j=1}^{n} x_i^j w_j + w_i^{WS} + w_i^{DS} \leq W_i, i = 1,2, \ldots, m, \quad (1)$$

wherein $w_j$ is the width of finished product, $w_i^{WS}$ is the maximum defect width on the working side of small plate, $w_i^{DS}$ is the maximum defect width on the driving side of small plate, and $W_i$ is the width of small plate.

According to the embodiment of the present application, the layout vector is to represent the layout modes of each small plate, namely the strip number corresponding to each finished product specification on each small plate, into the form of mathematical vector.

Optionally, the parameter information further includes a margin default value, and the first constraint further comprises:

$$\sum_{j=1}^{n} x_i^j w_j + \max\{w_i^{WS}, s\} + \max\{w_i^{DS}, s\} \leq W_i, i = 1,2, \ldots, m, \quad (2)$$

wherein $w_j$ is the width of finished product, $w_i^{WS}$ is the maximum defect width on the working side of small plate, $w_i^{DS}$ is the maximum defect width on the driving side of small plate, $W_i$ is the width of small plate, and s is the margin default value.

According to the embodiment of the present application, the margin default value is the minimum width required to be reserved on the edge of the plate according to the requirement of the customer so as to avoid the influence of the unevenness of the edge on the quality of finished product.

Optionally, the specification information further includes a demand quantity and a demand tolerance of finished product; and wherein the parameter information further includes a length of small plate; and wherein the constraints further include a second constraint corresponding to the demand quantity of finished product.

Optionally, the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$ wherein $x_i^j$ represents the strip number of finished product specification j on the $i^{th}$ small plate, and wherein the decision variables comprise the $x_i^j$; and wherein the second constraint comprises:

$$\sum_{i=1}^{m} x_i^j L_i \leq l_j(1 + e_j), j = 1,2, \ldots, n, \quad (3)$$

wherein $L_i$ is the length of small plate, $l_j$ is the demand quantity of finished product, and $e_j$ is the demand tolerance of finished product.

Optionally, the parameter information further includes a product-yield, and the constraints further include a third constraint corresponding to the product-yield of each small plate.

Optionally, the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and the decision variables comprise the $x_i^j$; and wherein the product-yield includes a minimum product-yield, and the third constraint comprises:

$$\frac{\sum_{j=1}^{n} x_i^j w_j}{W_i} \geq P, i = 1,2, \ldots, m, \quad (4)$$

wherein P is the minimum product-yield, $w_j$ is the width of finished product, and $W_i$ is the width of small plate.

Optionally, the parameter information further includes a minimum coiling length of a production apparatus for the plate, the decision variables further include a residual demand quantity and a completion quantity of finished product, and the constraints further include a fourth constraint corresponding to the minimum coiling length.

Optionally, the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and the decision variables include $x_i^j$, $y_j$ and $z_j$; and wherein the layout method for nesting and shear cutting of the defective plate further includes the following steps: setting $y_j$ as real variable representing the residual demand quantity of the finished product specification j; setting $z_j$ as binary variable representing whether the demand quantity of the finished product specification j is completed, and if completed, the variable is taken as 1, otherwise, it is taken as 0; and setting M as a constant value, wherein $M \geq \max\{l_1, l_2, \ldots, l_n\}$; and wherein the fourth constraint comprises:

$$y_j = l_j(1 - e_j) - \sum_{i=1}^{m} x_i^j L_i, j = 1,2, \ldots, n, \quad (5)$$

wherein $L_i$ is the length of small plate, $l_j$ is the demand quantity of finished product, and $e_j$ is the demand tolerance of finished product; and $$M(1-z_j) \geq y_j \geq N(1-z_j) - M z_j, j=1,2,\ldots,n \quad (6),$$

wherein N is the minimum coiling length.

Optionally, the plate is a silicon steel plate.

Yet another embodiment of the present invention further discloses a production optimization method for nesting and shear cutting of a defective plate, including any one of the foregoing layout methods for nesting and shear cutting of a defective plate, and the step of finding out the layout modes of each small plate that satisfies the constraints includes: setting optimization objectives for nesting and shear cutting of the plate; establishing a model for nesting and shear cutting of the plate based on the decision variables, the constraints and the optimization objectives; and solving the model to obtain the layout modes.

By utilizing the above technical solution, the production efficiency of the plate processing process can be improved by the production optimization method for nesting and shear cutting of a defective plate.

Optionally, the optimization objectives include an average product-yield of small plates, and/or, a sum of the completed quantities of finished products.

Optionally, the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i = (x_i^1, x_i^2, \ldots, x_i^j, \ldots, x_i^n)$, wherein $x_i^j$ represents the strip number of finished product specification j on the $i^{th}$ small plate; and wherein the decision variables include $x_i^j$ and $z_j$, wherein $z_j$ represents whether the demand quantity of the finished product specification j is completed, and if completed, the variable is taken as 1, otherwise, it is taken as 0; and the optimization objectives include an average product-yield of small plates and a sum of the completed quantities of finished products; and wherein the average product-yield of small plates is set as a first optimization objective:

$$\max obj1 = (\frac{1}{m}\sum_{i=1}^{m}\frac{\sum_{j=1}^{n}x_i^j w_j}{W_i}), \tag{7}$$

wherein $w_j$ is the width of finished product, and $W_i$ is the width of small plate; the sum of the completed quantities of finished products is set as a second optimization objective:

$$\max obj2 = \sum_{j=1}^{n}z_j; \tag{8}$$

and

The optimization objective is obtained by weight summing the first optimization objective and the second optimization objective.

Optionally, the parameter information includes a length of small plate, and the production optimization method for nesting and shear cutting of a defective plate further comprises the following steps: issuing control instruction according to the electronic defect map, the parameter information and the layout mode; and performing nesting and shear cutting on the plate according to the control instruction.

Yet another embodiment of the present invention further discloses a preprocessing system for nesting and shear cutting of a defective plate, comprising a processing unit for processing the plate by any one of the foregoing preprocessing methods for nesting and shear cutting of a defective plate.

By utilizing the above technical solution, the scrap rate of plate processing can be reduced by the preprocessing system for nesting and shear cutting of a defective plate.

Another embodiment of the present invention further discloses a layout system for nesting and shear cutting of a defective plate, comprising a processing unit for processing the plate by any one of the foregoing layout methods for nesting and shear cutting of a defective plate.

By utilizing the above technical solution, the layout system for nesting and shear cutting of a defective plate can facilitate processing production of the plate.

Another embodiment of the present invention further discloses a production optimization system for nesting and shear cutting of a defective plate, comprising: a processing unit used for a solution which uses any one of the foregoing production optimization methods for nesting and shear cutting of a defective plate; a control unit for receiving the solution transmitted from the processing unit, and issuing control instruction according to the solution; and a production apparatus for receiving the control instruction, and performing nesting and shear cutting on the plate according to the control instruction.

By utilizing the above technical solution, the production efficiency of the plate processing process can be improved by the production optimization system for nesting and shear cutting of a defective plate.

Another embodiment of the present invention further discloses a computing device, comprising: a processor for implementing various instructions; and a memory for storing a plurality of instructions for the processor to load and execute any one of the foregoing preprocessing methods for nesting and shear cutting of a defective plate.

Another embodiment of the present invention further discloses a computing device, comprising: a processor for implementing various instructions; and a memory for storing a plurality of instructions for the processor to load and execute any one of the foregoing layout methods for nesting and shear cutting of a defective plate.

Another embodiment of the present invention further discloses a computing device, comprising: a processor for implementing various instructions; and a memory for storing a plurality of instructions for the processor to load and execute any one of the production optimization methods for nesting and shear cutting of a defective plate.

Another embodiment of the present invention further discloses a storage medium stored with a plurality of instructions for the processor to load and execute any one of the foregoing preprocessing methods for nesting and shear cutting of a defective plate.

An embodiment of the present invention further discloses a storage medium stored with a plurality of instructions for the processor to load and execute any one of the foregoing layout methods for nesting and shear cutting of a defective plate.

Another embodiment of the present invention discloses a storage medium stored with a plurality of instructions for the processor to load and execute any one of the production optimization methods for nesting and shear cutting of a defective plate.

BRIEF DESCRIPTION OF THE DRAWINGS

FIG. 3 shows a flow chart of step S2 of a preprocessing method for nesting and shear cutting of a defective plate according to an embodiment of the present invention;

DETAILED DESCRIPTION

The implementations of the present invention are illustrated by the following specific embodiments, and those skilled in the art may learn other advantages and features of the present invention easily from the following detailed description. Although the present invention will be described in conjunction with the preferred embodiments, it is not intended that the features of the present invention are limited to those embodiments. On the contrary, the present invention has been described in connection with the embodiments for the purpose of covering alternatives or modifications which may be extended based on the claims of the present invention. In the following description, numerous specific details are included to provide a thorough understanding of the present invention. The present invention may be implemented without these details. Moreover, some of the specific details have been omitted from the description in order not to disorder or obscure the focus of the present invention. It should be noted that, the embodiments and their features in the present invention may be combined with each other without conflict.

It should be noted that, in this specification, similar reference signs and letters refer to similar items in the following figures, and thus, once an item is defined in a figure, it needs not be further defined and explained in subsequent figures.

The terms "first," "second," and the like are used solely to distinguish one from another and are not to be construed as indicating or implying relative importance.

To make the objectives, technical solutions and advantages of the present invention more apparent, the embodiments of the present invention will be described in detail with reference to the accompanying drawings.

Figure 1:
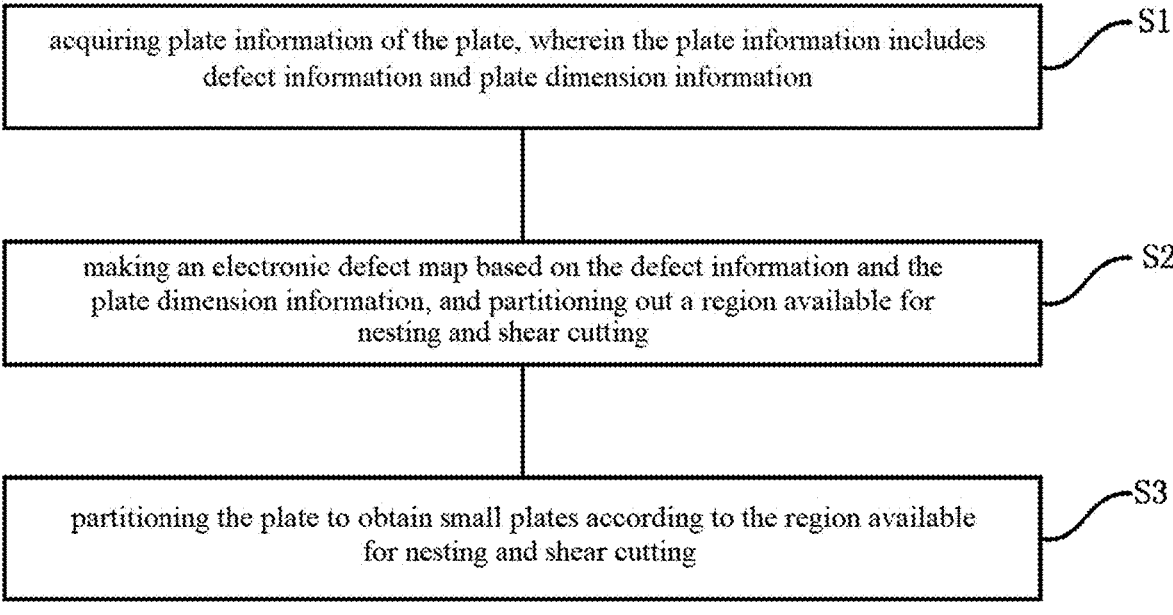
FIG. 1 shows a flow chart of a preprocessing method for nesting and shear cutting of a defective plate according to an embodiment of the present invention.

Referring to FIG. 1, an embodiment of the present invention discloses a preprocessing method for nesting and shear cutting of a defective plate, comprising the following steps: S1: acquiring plate information of the plate, wherein the plate information includes defect information and plate dimension information; S2 making an electronic defect map based on the defect information and the plate dimension information, and partitioning out a region available for nesting and shear cutting; and S3: partitioning the plate to obtain small plates according to the region available for nesting and shear cutting.

In S1, the plate information may be derived from measurement, product specifications, written warranty, and the like, and may be obtained by writing, or may be obtained by scanning codes, and the like, which is not limited in the embodiment. In S2, the electronic defect map is made based on the defect information and the plate dimension information, and the region available for nesting and shear cutting is partitioned out. That is to say, in the embodiment, an electronic schematic diagram of a plate may be made according to the plate dimension information. For example, the electronic schematic diagram for the plate is drawn according to a certain proportion. Then the defect information is digitized according to the size and the position of the defect, and is marked on the electronic schematic diagram of the plate, so as to obtain the electronic defect map. After removing the region where the defect is located, the remaining of the plate is the region available for nesting and shear cutting. Without being bound to the embodiment, the electronic schematic diagram of the plate may be made by a computer, a mobile terminal, a cloud server, or the like, which all have data entry and processing functions. In S3, the plate is partitioned according to the region available for nesting and shear cutting, that is, the electronic defect map of the plate is partitioned to obtain small plates. Optionally, the preprocessing method for nesting and shear cutting of a defective plate further comprises: displaying the obtained schematic diagram of the plate after preprocessing, so that the manufacturer can intuitively know the position and the size of each small plate, and check whether the defect information is wrong. In the present embodiment, the small plates are obtained by partitioning the plates based on the electronic defect map made by the digitized defect information instead of cutting the plate directly, which can help determine the subsequent processing solution for the plate before the production, thus having high scientificity and can improve the production efficiency.

Figure 2:
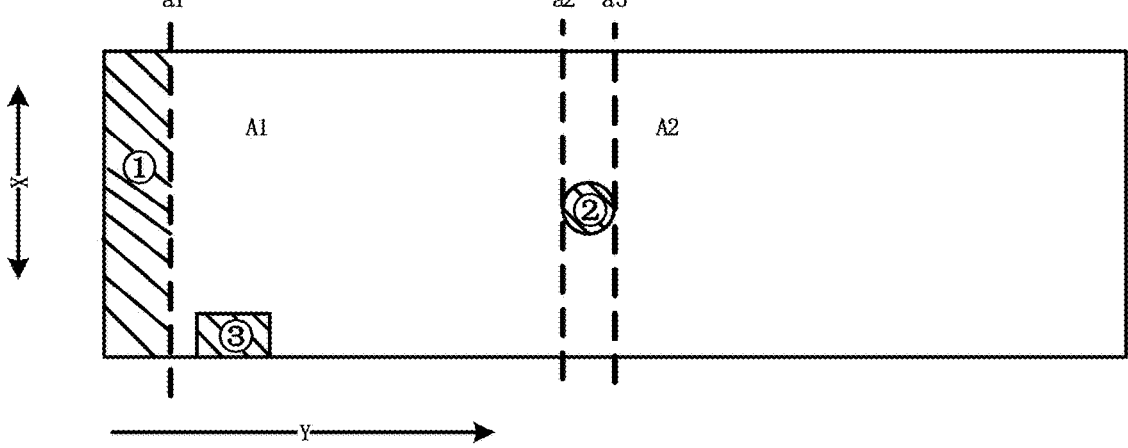
FIG. 2 shows a schematic diagram of an electronic defect map of a plate according to an embodiment of the present invention.
Figure 5:
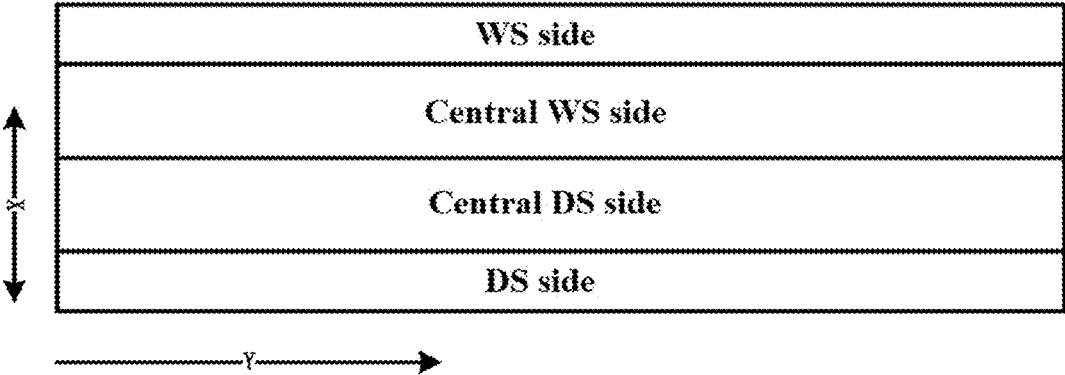
FIG. 5 is a schematic diagram of partitioned regions of a plate according to an embodiment of the present invention.

In one embodiment, referring to FIG. 2 and FIG. 5, the plate is a steel plate having a width of 1100 millimeters and a length of 2000 meters. In the present embodiment, the plate is partitioned into four regions, namely a WS side (working side), a central WS side (central working side), a central DS side (central driving side) and a DS side (driving side), along a width direction (X direction shown in FIG. 2 and FIG. 5), wherein the working side is a side for the worker to operate, and the driving side is a side where a drive motor is located. Along a length direction (Y direction shown in FIG. 2) of the plate, the blade assembling place during actual processing of the plate is set as a starting point, that is, the 0-meter position in length. In other embodiments, the plate may be partitioned by other methods. The defect information of the steel plate includes: (1) a 0-150-meter full-width fold; (2) a hole with the diameter=14.96 millimeters in the 950-meter on central DS side; and (3) 0-50-millimeter edge damage in the 200-500-meter on DS side. It should be appreciated that, in other embodiments, the defect information may also include other contents, such as defect grades. Other methods may be also used to describe the defect, as long as the defect regions can be located on the plate according to the defect information.

Referring to FIG. 2, the electronic defect map of the plate includes the aforementioned three defects. Because the length of the plate is far greater than the width of the plate, the plate needs to be shear cut into a plurality of small plates transversely, i.e., along the width direction of the plate in the actual processing process. Therefore, in the present embodiment, the plate is partitioned transversely along the width direction of the plate according to the region available for nesting and shear cutting shown by the electronic defect map, and the plate may be partitioned into two small plates A1 and A2 along dotted lines a1, a2 and a3. Referring to the region available for nesting and shear cutting, regarding defect (3) which is located at the edge in the width direction of the plate, it does not need to be considered during partitioning the plate as the small plates are obtained by partitioning the plate transversely in the embodiment. After partition of the small plates, defect (3) is located on the small plate A1, and can be considered when the small plate A1 is subjected to layout and nesting and shear cutting, so that the overall plate processing efficiency can be improved. Without being bound to the embodiment, the plate may be also partitioned into small plates longitudinally along the length direction of the plate according to the size of the plate in other embodiments. In the present embodiment, defects (1) and (2) have been eliminated during partition of the small plates, while defect (3) has been presented in the electronic defect map for facilitating timely removal when the small plates are subjected to layout and nesting and shear cutting. Therefore, it would not lead to unqualified finished product due to the presence of the defects in the subsequent processing process of the plate, which greatly reduces the scrap rate of the plate. Without being bound to the embodiment, in other embodiments, the type and size of the plate, as well as the number, size, type and the like of the defects may be different from those of the present embodiment.

By utilizing the above technical solution, the preprocessing method for nesting and shear cutting of a defective plate disclosed by the present embodiment can help fully consider the adverse effect of the defects in the subsequent processing of the plate and partition out a region available for nesting and shear cutting by making an electronic defect map, so that the plate is reasonably partitioned into small plates according to the positions provided by the region available for nesting and shear cutting. Therefore, the technical solution can help avoid unqualified finished products caused by the defects in the subsequent plate processing and reduce the scrap rate, thus further reducing the production cost in plate processing.

Referring to FIG. 3, another embodiment of the present invention discloses a preprocessing method for nesting and shear cutting of a defective plate. The defect information includes that of primitive defects. The step S2 of making the electronic defect map based on the defect information and the plate dimension information, and partitioning out the region available for nesting and shear cutting comprises: S21: making the electronic defect map based on the primitive defects and the plate dimension information; S22: obtaining all non-edge defects based on the primitive defects; S23: computing distances between every two adjacent non-edge defects along the length direction of the plate; S24: merging any two adjacent non-edge defects along the length direction into a customized defect when their distances are lower than or equal to a predetermined distance threshold; and S25: partitioning out the region available for nesting and shear cutting based on the primitive defects and the customized defect.

Figure 4:
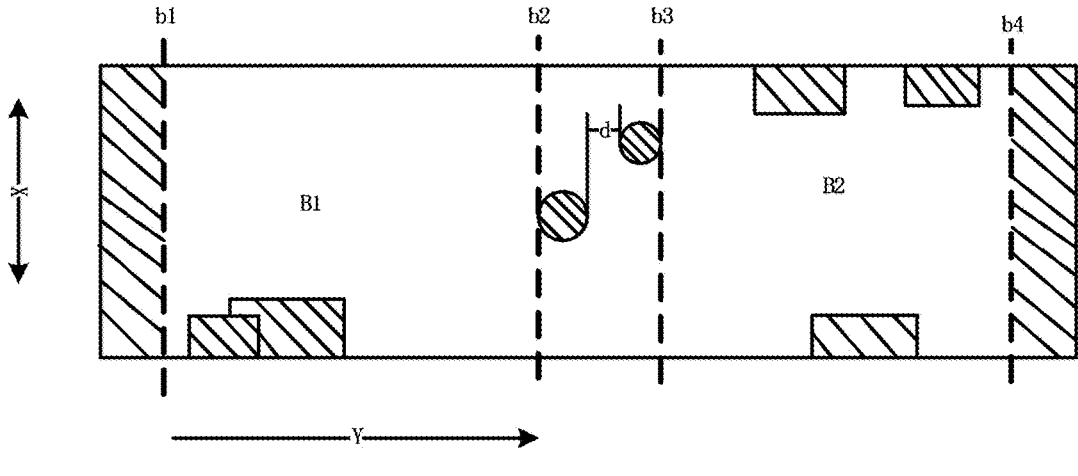
FIG. 4 shows a schematic diagram of an electronic defect map of a plate according to another embodiment of the present invention.

Referring to FIG. 3-FIG. 5, in S21, the electronic defect map is made based on the primitive defects and the plate dimension information. In one embodiment, the plate is a steel plate with a width of 1100 millimeters and a length of 2000 meters, and the defect information of the plate is as shown in the following Table 1:

TABLE 1

| Serial number of defects | Text description of defects |
|---|---|
| Defect 1 | 0-150-meter full-width fold of grade 4 |
| Defect 2 | Hole with a diameter = 14.96 millimeters in the 950-meter on central DS side |
| Defect 3 | Hole with a diameter = 11.74 millimeters in the 1000-meter on central WS side |
| Defect 4 | 0-50-millimeter edge damage of grade 5 in the 200-500-meter on DS side |

TABLE 1-continued

| Serial number of defects | Text description of defects |
|---|---|
| Defect 5 | 0-70-millimeter frost descent of grade 4 in the 400-900-meter on DS side |
| Defect 6 | 0-40-millimeter spot of grade 2 in the 1200-1600-meter on DS side |
| Defect 7 | 0-60-millimeter indentation of grade 3 in the 1100-1400-meter on WS side |
| Defect 8 | 0-50-millimeter frost descent of grade 4 in the 1500-1800-meter on WS side |
| Defect 9 | Full-width transverse stripe of grade 3 in the 1820-2000-meter |

In the present embodiment, the plate is partitioned into four regions, i.e., a WS side (working side), a central WS side (central working side), a central DS side (central driving side), and a DS side (driving side) along its width direction (X direction shown in FIG. 4 to FIG. 5). The width of each region may be equally or unequally partitioned. Without being bound to the embodiment, the specific width may be set according to the defect description. In the present embodiment, along a length direction (Y direction shown in FIG. 4 to FIG. 5) of the plate, a blade assembling place during actual processing of the plate is set as a starting point, that is, the position of 0-meter in length. In other embodiments, the number of regions, the partitioning method, and the width of each region may be adaptively set according to the description of the defects in the defect information. In the present embodiment, referring to FIG. 4, 9 primitive defects according to Table 1 are shown, and a corresponding electronic defect map can be obtained according to the plate dimension information. A corresponding region of each defect is illustrated by the shaded portion in FIG. 4. Optionally, each defect is represented in a digitized form with reference to the mode as shown in the following Table 2 regarding the digitization of defect 6 in aforementioned Table 1, so as to facilitate making of the electronic defect map.

TABLE 2

| Defect type | Length position (starting point) | Length position (end point) | Width region | Width position (starting point) | Width position (end point) | Defect grade |
|---|---|---|---|---|---|---|
| spot | 1200 | 1600 | DS side | 0 | 40 | 2 |

In S22, all non-edge defects are derived from the primitive defects. In the present embodiment, the plate needs to be shear cut into a plurality of small plates transversely, namely, along the width direction of the plate. Therefore, in the present embodiment, the plate is partitioned transversely along the width direction of the plate according to the region available for nesting and shear cutting of the electronic defect map. The non-edge defects in the embodiment are defects located on the central WS side (central working side) or the central DS side (central driving side), and defect 2 and defect 3 are non-edge defects. In S23, the distances between every two adjacent non-edge defects are computed along the length direction of the plate. In the present embodiment, the distance is shown as d in FIG. 4, wherein d=1000−950=50 meters as the diameter of the hole is ignored for its too-small diameter. In S24, if the distances are lower than or equal to a predetermined distance threshold, the corresponding adjacent non-edge defects are merged into the customized defect along the length direction.

In some embodiments, the predetermined distance threshold is greater than or equal to a minimum coiling length of the production apparatus for the plate. The minimum coiling length is the minimum distance between two adjacent shear cutting positions in the length direction of the plate during the actual processing process of the plate when the plate is shear cut into small plates along the width direction of the plate, and the specific numerical values are different according to different requirements of production apparatus and process standards, which may be 500 meters or 300 meters, and the like, for example. In the present embodiment, if the predetermined distance threshold is 500 meters, defect 2 and defect 3 are then merged into a customized defect. In S25, a region available for nesting and shear cutting is partitioned based on the primitive defects and the customized defect. That is to say, the region available for nesting and shear cutting does not include the region between defect 2 and defect 3, and the 950-to-1000-meter full-width region along the length direction of the steel plate is not subjected to nesting and shear cutting. Along dotted lines b1, b2, b3 and b4 in FIG. 4, the steel plate may be partitioned into two small plates B1 and B2. Without being bound to the embodiment, the predetermined distance threshold may be other values in other embodiments.

In the present embodiment, the plate partitioned after preprocessing can better meet the requirements of the production apparatus in the subsequent processing process by setting the distance threshold and merging the non-edge defects according to the predetermined distance threshold. Preferably, the predetermined distance threshold is equal to the minimum coiling length of the production apparatus for the plate, so that the partitioned plate can not only meet the requirements of the production apparatus, but also avoid unnecessary defect merging that waste the plate.

It should be appreciated that, because the plate is different from the products to be processed, part of the primitive defects are acceptable for the products to be processed. At this point, quality evaluation may be performed on all the primitive defects, and the acceptable defects are released according to information such as type, grade, size and the position of the defects. Then, the electronic defect map is made or updated according to unacceptable defects, and the plate is partitioned into small plates finally. Preferably, the quality evaluation of the defects can be automatically carried out according to the plate information, the information of the products to be processed, customer requirements and the like recorded in a computer, a mobile terminal, a cloud server and the like that have data entry and processing functions, so as to improve production efficiency.

Another embodiment of the present invention further discloses a layout method for nesting and shear cutting of a defective plate, comprising any one of the preprocessing methods for nesting and shear cutting of a defective plate in the foregoing embodiments. The layout method for nesting and shear cutting of a defective plate comprises the following steps: acquiring specification information of each finished product for the products to be processed; acquiring parameter information of each small plate; setting decision variables relating to layout modes of each small plate, and establishing the constraints among the decision variables, the specification information and the parameter information; and finding out the layout mode of each small plate that satisfies the constraints.

In the present embodiment, the specification information and the parameter information only need to be acquired before finding out the layout mode, and there is not any sequential limitation or requirement between each other.

Without being bound to the embodiment, the specification information may be acquired either before or after preprocessing for nesting and shear cutting of a defective plate. The specification information may include a width of finished product, a demand quantity of finished product and the like; the parameter information may include a width of small plate, a length of small plate and the like; the constraints may include a length constraint, a width constraint, a product-yield constraint and the like; and the specification information, the parameter information and the constraints may be set as needed, which is not limited herein by the embodiment.

In the present embodiment, the layout mode of each small plate in the plate is found out by establishing the constraints, so that the scientificity is high, and it is convenient to obtain the solution of the whole plate according to the layout mode before nesting and shear cutting of the plate, which facilitates the processing of the plate, and is beneficial for more accurate and scientific nesting and shear cutting production of the plate.

Another embodiment of the present invention discloses a layout method for nesting and shear cutting of a defective plate, wherein the specification information includes a width of finished product; the parameter information includes a width of small plate, a maximum defect width on the working side of small plate and a maximum defect width on the driving side of small plate; the decision variables include a strip number of each finished product specification on each small plate, and the constraints include a first constraint corresponding to the width of small plate.

The layout method for nesting and shear cutting of a defective plate disclosed by the present embodiment is used for integrally planning the plate according to the products to be processed, and solving the layout modes of each small plate by establishing the first constraint involving the width of small plate, the maximum defect width on the working side of small plate, the maximum defect width on the driving side of small plate and the decision variables, so that processing production of the plate is facilitated. Moreover, the adverse effect of edge defects is fully considered, which prevents the unqualified finished products caused by the defects from being processed, so that the scrap rate in the subsequent processing process of the plate is greatly reduced.

Another embodiment of the present invention discloses a layout method for nesting and shear cutting of a defective plate, which comprises small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and wherein the decision variables comprise the $x_i^j$; and the first constraint comprises:

$$\sum_{j=1}^{n} x_i^j w_j + w_i^{WS} + w_i^{DS} \leq W_i, \, i = 1,2, \ldots , m, \tag{1}$$

wherein $w_j$ is the width of finished product, $w_i^{WS}$ is the maximum defect width on the working side of small plate, $w_i^{DS}$ is the maximum defect width on the driving side of small plate, and $W_i$ is the width of small plate.

In the present embodiment, the layout vector for each small plate may be found out according to formula (1). The layout vector is to represent the layout modes of each small plate, namely the strip number corresponding to each finished product on the small plate, into the form of mathematical vector. A corresponding layout mode can be obtained according to the layout vector. The blade assembling modes of each small plate in the subsequent processing process can be correspondingly obtained according to the layout modes and the width of edge defect, which facilitates subsequent processing production of the plate.

In one embodiment, the plate is a steel plate with a width of 1100 millimeters and a length of 2000 meters. In an actual production process of the steel plate, it adopts a blade assembling mode that a plurality of disc blades are arranged along the width direction of the steel plate, and each small plate is cut into finished strips by the blades along the length direction of the steel plate. In the present embodiment, the product to be processed is a certain kind of transformer, and in the actual processing process, the steel plate needs to be processed into finished strips conforming to the transformer specifications required by the customer, after which the finished strips can be rolled into small coils and delivered to the customer. The finished product specifications of transformers are generally categorized by width, and finished strips with various width specifications are typically required to manufacture one transformer. In the present embodiment, the transformer has 18 kinds of finished product specifications corresponded thereto, and the width corresponding to each finished product specification is as shown in Table 3 below:

TABLE 3

| Index of finished product | Width of finished product $w_j$ | Demand quantity of finished product $l_j$ | Demand tolerance of finished product $e_j$ |
|---|---|---|---|
| 1 | 600 | 1868 | 3% |
| 2 | 580 | 1587 | 3% |
| 3 | 560 | 1689 | 3% |
| 4 | 540 | 1442 | 3% |
| 5 | 520 | 1658 | 3% |
| 6 | 500 | 2430 | 3% |
| 7 | 480 | 2466 | 3% |
| 8 | 460 | 2500 | 3% |
| 9 | 440 | 3967 | 3% |
| 10 | 420 | 4264 | 3% |
| 11 | 400 | 4139 | 3% |
| 12 | 360 | 3507 | 3% |
| 13 | 340 | 3536 | 3% |
| 14 | 300 | 3348 | 3% |
| 15 | 260 | 2242 | 3% |
| 16 | 220 | 1555 | 3% |
| 17 | 210 | 1224 | 3% |
| 18 | 205 | 1385 | 3% |

The width of finished product $w_j$ is a width value of the $j^{th}$ finished product after the product to be processed is completed. In the present embodiment, the unit of the finished product width $w_j$ is millimeter. Then according to the forgoing Table 3, $w_1$, $w_{18}$ may be obtained.

In the present embodiment, the defect information corresponding to the steel plate is the same as Table 1 in the foregoing embodiment. In particular, defect 1 and defect 9 are full-width defects, which cannot be used for subsequent nesting and shear-cutting process. Referring to FIG. 4, the plate is partitioned transversely along dotted lines b1, b2, b3 and b4 in the width direction (X direction shown in FIG. 4), so that the plate is partitioned into a small plate B1 and a small plate B2 in length, wherein the diameter of the hole is negligibly small and the distance between defect 2 and defect 3 is too short, and thus, the two defects can be merged into a customized defect.

Then, the layout vector of each small plate is found out. The layout vector satisfies the above formula (1), that is, for each small plate, the sum of the total width corresponding to the finished product specification and the maximum defect widths on both sides is not greater than the width of small plate. In the present embodiment, the width of small plate is the same as the width of steel plate. It should be appreciated that, in some embodiments, only one $X_i$ meets the conditions, and in other embodiments, there may be more than one $X_i$ satisfying the conditions. Therefore, without being bound to the embodiment, there may be one or more selectable layout modes and corresponding blade assembling modes, and one of which may be selected as needed to perform actual processing.

Another embodiment of the present invention discloses a layout method for nesting and shear cutting of a defective plate, and the parameter information further includes a margin default value, and the first constraint further comprises:

$$\sum_{j=1}^{n} x_j^j w_j + \max\{w_i^{WS}, s\} + \max\{w_i^{DS}, s\} \le W_i, i = 1,2, \dots, m, \quad (2)$$

wherein $w_j$ is the width of finished product, $w_i^{WS}$ is the maximum defect width on the working side of small plate, $w_i^{DS}$ is the maximum defect width on the driving side of small plate, $W_i$ is the width of small plate, and $s$ is the margin default value.

Figure 6:
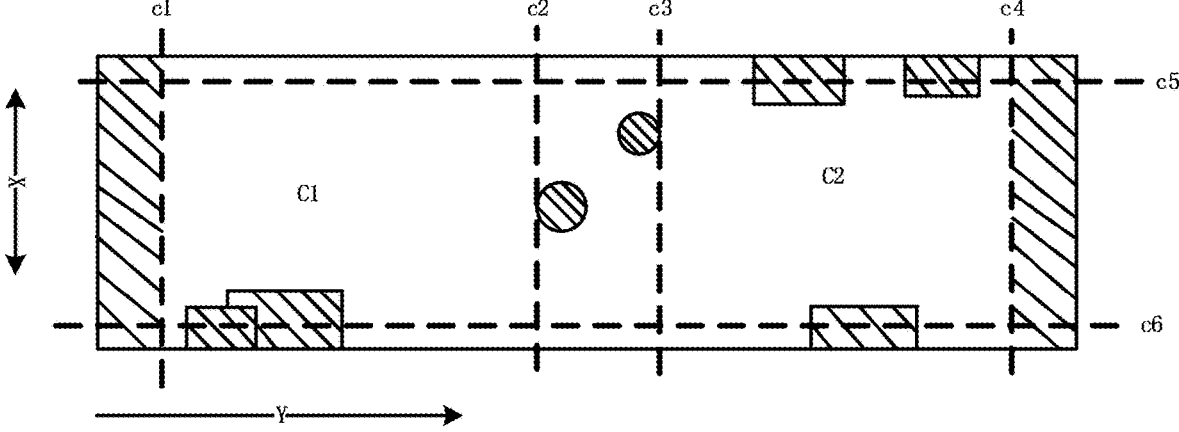
FIG. 6 is a schematic diagram of an electronic defect map of a plate according to another embodiment of the present invention.

In the present embodiment, the margin default value means that some plates, such as silicon steel plates, are prone to have uneven edge during the production process thereof, and the edge are not suitable for being processed into finished products, which may affect the quality of finished products. Therefore, it is desirable to reserve certain margin as scrap on the edge during the processing of the plate. Referring to FIG. 5 to FIG. 6, in the case that the plate is partitioned into small plates along the width direction (X direction shown in FIG. 6) of the plate, and the small plates are shear cut along the length direction (Y direction shown in FIG. 6) of the plate, the margin default value is the minimum width that needs to be reserved for the two sides of the plate, which can refer to two dotted lines c5 and c6 parallel to the Y direction in FIG. 6. In the present embodiment, when solving the layout mode, the requirement of the margin default value is considered, so that the production of products to be processed with higher requirements on the edge of the plate can be implemented better, which further reduces the scrap rate of the plate.

Referring to FIG. 6, in one embodiment, the defect information corresponding to the plate is the same as the defect information in Table 1 in the foregoing embodiment, the plate is partitioned into a small plate C1 and a small plate C2 along dotted lines c1, c2, c3 and c4. With regard to small plate C1, there is no defects on the working side, $w_1^{WS}=0$, whereas the driving side has a defect 4 and a defect 5, $w_1^{DS}=\max\{50,70\}=70$ millimeters. With regard to small plate C2, the working side has a defect 7 and a defect 8, $w_2^{WS}=\max\{60,50\}=60$ millimeters, and the driving side has a defect 6, $w_2^{DS}=40$ millimeters. Moreover, in the present embodiment, the margin default value s of the plate is 20 millimeters. The first constraint further includes formula (2), by which a layout vector satisfying the constraint can be found out. It should be appreciated that, without being bound to the embodiment, the margin default value may also be other numerical values in other embodiments.

Another embodiment of the present invention discloses a layout method for nesting and shear cutting of a defective plate, wherein the specification information further includes a demand quantity and a demand tolerance of finished product; the parameter information further includes a length of small plate; and the constraints further include a second constraint corresponding to the demand quantity of finished product.

In the present embodiment, by introducing a second constraint, nesting and shear cutting of the plate can be better planned by the found-out layout mode, so that the capacity waste is reduced.

Another embodiment of the present invention discloses a layout method for nesting and shear cutting of a defective plate. The plate comprises small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i=(x_i^1, x_i^2, \ldots, x_i^j, \ldots, x_i^n)$, wherein represents the strip number of finished product specification j on the $i^{th}$ small plate, and the decision variables comprise the $x_i^j$; and the second constraint comprises:

$$\sum_{i=1}^{m} x_i^j L_i \le l_j(1 + e_j), j = 1,2, \ldots , n, \tag{3}$$

wherein $L_i$ is the length of small plate, $l_j$ is the demand quantity of finished product, and $e_j$ is the demand tolerance of finished product.

In the present embodiment, with the support of formula (3), when products to be processed comprising multiple finished product specifications are needed to be processed from the plates, the circumstance that part of the finished product specifications are overproduced and other finished product specifications are underproduced can be mitigated, which better meets the requirement of actual production and facilitates the batch production of the products to be processed that have various specifications. The demand tolerance is the tolerance range of the product to be processed having specific finished product specification with respect to the demand quantity of the finished product. The value of the demand tolerance can be set as needed according to the type of the product to be processed and different requirements of customers. The demand tolerance is introduced to not only meet the requirements of customers on the products to be processed, but also facilitate the multiple-strip production of finished product specifications, and further facilitate shear cutting on the small plates.

In one embodiment, the plate is a steel plate having a width of 1100 millimeters and a length of 2000 meters. The defect information corresponding to the steel plate is the same as Table 1 in the foregoing embodiment. In particular, defect 1 and defect 9 are full-width defects, which both cannot be used for subsequent nesting and shear cutting processing. Referring to FIG. 4, the plate is partitioned transversely along dotted lines b1, b2, b3 and b4 in the width direction (X direction shown in FIG. 4), so that the plate is partitioned into a small plate B1 and a small plate B2 in length, wherein the diameter of the hole is negligibly small, and the distance between defects 2 and 3 is too short, and thus, defects 2 and 3 can be merged into a customized defect. The small plate B1 has a length $L_1$=950−150=800 meters, and the small plate B2 has a length $L_2$=1820−1000=820 meters. The specification information of the corresponding product to be processed refers to Table 3 in the foregoing embodiment, thereby obtaining $e_1, \ldots, e_{18}$. It should be appreciated that, in some embodiments, the demand tolerance may further include an upper limit of demand tolerance and a lower limit of demand tolerance. At this point, $e_j$ in formula (3) of the embodiment is the upper limit of demand tolerance in particular. In the present embodiment, the absolute value of the upper limit of demand tolerance and that of the lower limit of demand tolerance are equal and are collectively expressed as the demand tolerance in Table 3. Without being bound to the embodiment, the absolute value of the upper limit of demand tolerance and that of the lower limit of demand tolerance may be different in other embodiments, and the demand tolerances of different finished product specifications may also be different. In the embodiment, the decision variable $x_i^j$ also needs to satisfy formula (3), and the layout vector $X_i$ can be found out according to formulas (1) and (3), so as to obtain the layout mode of each small plate.

Another embodiment of the present invention discloses a layout method for nesting and shear cutting of a defective plate, wherein the parameter information further includes a product-yield, and the constraints further include a third constraint corresponding to the product-yield of each small plate.

In the embodiment, by introducing the third constraint, the product-yield of each small plate may be constrained, so that the found-out layout mode satisfies the corresponding product-yield requirement.

Another embodiment of the present invention discloses a layout method for nesting and shear cutting of a defective plate. The plate comprises small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i(x_i^1, x_i^2, \ldots, x_i^j, \ldots, x_i^n)$, wherein $x_i^j$ represents the strip number of finished product specification j on the $i^{th}$ small plate, and the decision variables comprise the $x_i^j$; the product-yield includes a minimum product-yield, and the third constraint comprises:

$$\frac{\sum_{j=1}^{n} x_i^j w_j}{W_i} \ge P, i = 1,2, \ldots , m, \tag{4}$$

wherein P is the minimum product-yield, $w_j$ is the width of finished product, and $W_i$ is the width of small plate.

In the present embodiment, by setting a minimum product-yield P, the product-yield of each small plate corresponding to the found-out layout mode will not be lower than a predetermined value, so that the overall product-yield of the whole plate in the actual processing production process is greatly improved. In one embodiment, P is 80%, and in other embodiments, P may be other values. Without being bound to the embodiment, the specific numerical value of the minimum product-yield P may be set according to the type of the plate, the type of the product to be processed, and the like.

Another embodiment of the present invention discloses a layout method for nesting and shear cutting of a defective plate. The parameter information further includes a minimum coiling length of a production apparatus for the plate, the decision variables further include a residual demand quantity of finished product and a completion quantity of finished product, and the constraint further includes a fourth constraint corresponding to the minimum coiling length.

In the embodiment, by introducing the fourth constraint, the found-out layout mode facilitates nesting and shear cutting on the plate when applied, so that the production efficiency is improved.

Another embodiment of the present invention discloses a layout method for nesting and shear cutting of a defective plate. The plate comprises small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i=(x_i^1, x_i^2, \ldots x_i^j, \ldots, x_i^n)$, wherein $x_i^j$ represents the strip number of finished product specification j on the $i^{th}$ small plate, and the decision variables includes $x_i^j$, $y_j$ and $z_j$; the layout method for nesting and shear cutting of a defective plate further comprises the following steps: setting $y_j$ as real variable representing the residual demand quantity of the finished product specification j; setting $z_j$ as binary variable representing whether the demand quantity of the finished product specification j is completed, and if completed, the variable is taken as 1, otherwise, it is taken as 0; and setting M as a constant value, wherein M≥max{$l_1$, $l_2$, . . . , $l_n$}; and the fourth constraint comprises:

$$y_j = l_j(1 - e_j) - \sum_{i=1}^{m} x_i^j L_i, j = 1,2, \ldots, n, \quad (5)$$

wherein $L_i$ is the length of small plate, $l_j$ is the demand quantity of the finished product, and $e_j$ is the demand tolerance of the finished product; and $$M(1-z_j) \geq y_j \geq N(1-z_j) - Mz_j, j=1,2, \ldots, n \quad (6),$$

wherein N is the minimum coiling length.

In the present embodiment, when the production is performed on the whole plate according to the layout vector corresponding to each small plate, the residual demand quantity $y_j$ of each finished product, namely, an uncompleted value of each finished product, can be calculated by using formula (5). When $y_j$ is greater than 0, it represents that the demand quantity of the finished product specification j is not completed, at this point, $z_j=0$, otherwise, $z_j=1$. It should be appreciated that, in some embodiments, the demand tolerance may further include an upper limit of demand tolerance and a lower limit of demand tolerance. In this case, $e_j$ in formula (5) of the present embodiment is specifically the lower limit of the demand tolerance. A constant value M is set, and M is greater than or equal to a maximum value of the demand quantity of all finished product in the products to be processed. Formula (6) can constrain that if the demand quantity of a certain finished product is not completed, the corresponding residual demand quantity needs to be greater than or equal to the minimum coiling length N. Therefore, when one plate does not complete the demand quantity of a certain finished product in actual processing, the same production apparatus can be conveniently used to complete the residual demand of finished product using other plates for production, so that the production efficiency is improved.

In one embodiment, the plate is shear cut into small plates along the width direction of the plate. At this point, the minimum coiling length is a minimum distance between two adjacent positions that is shear cut in the width direction of the plate, and the specific numerical value differs according to the requirements of the production apparatus and the process standard. For example, the specific numerical value may be 500 meters, and may also be 300 meters.

Another embodiment of the present invention discloses a layout method for nesting and shear cutting of a defective plate, wherein the plate is a silicon steel plate. For example, with regard to shear cutting processing of a silicon steel product required for a transformer, the processing object is a coil of silicon steel, which will become a large rectangular silicon steel plate after it is unrolled. The silicon steel plate is processed into finished strips having transformer specifications required by customers, then the finished strips can be rolled into small coils and delivered to the customers. The finished specifications of the transformer refer to widths, and a plurality of width specifications are usually required for manufacturing one transformer. Silicon steel is a special product, and various defects such as holes, cracks, spots, color difference, roll marks, indentation, frost descent, stripes, folds, scratches and surface inclusions easily appear in the production process. Moreover, transformers have numerous finished product specifications and the silicon steel has different widths and different defect positions. In actual production, multiple finished product specifications of transformer are integrated together in one silicon steel plate, and the defective parts of the plate cannot be shear cut into finished products and provide to the customer. Therefore, during shear cutting, the defective parts need to be kept away to avoid providing the parts containing defects to the customers. The layout method disclosed by the present embodiment is particularly suitable for layout and subsequent processing of the silicon steel plate, which can greatly reduce the scrap rate of the silicon steel plate, improve the product-yield of the silicon steel plate, reduce the production cost, and improve the production efficiency.

Another embodiment of the present invention further discloses a production optimization method for nesting and shear cutting of a defective plate, including any one of the layout methods for nesting and shear cutting of a defective plate in the foregoing embodiments. The step of finding out the layout mode of each small plate satisfying the constraint condition includes: setting optimization objectives for nesting and shear cutting of the plate; establishing a model for nesting and shear cutting of the plate according to the decision variables, the constraints and the optimization objectives; and solving the model to obtain the layout mode.

In the present embodiment, a model is established by determining the decision variables, the constraints and the optimization objectives, so that a layout mode of each small plate can be quickly and efficiently found out. The production efficiency of the plate processing process can be improved, and the method is particularly suitable for a data processing device such as a computer. In one embodiment, the optimization objectives may be the product-yield. Without being bound to the embodiment, the optimization objectives may also be other objectives in other embodiments, which may be specifically set as needed. In one embodiment, the model is an integer programming model, and is solved by using a linear integer programming method. Without being bound to the embodiment, the model may also be solved by using other methods in other embodiments.

In the present embodiment, by digitizing the defect information of the plate and replacing the traditional direct shear cutting mode, a mathematical model for nesting and shear cutting of the plate is established, so that the plate is processed optimally in actual nesting and shear cutting production, which has high scientificity to reduce the loss of raw materials and improve the production efficiency greatly.

Another embodiment of the present invention further discloses a production optimization method for nesting and shear cutting of a defective plate. The optimization objectives include an average product-yield of the small plates, and/or, a sum of the completed quantities of the finished product. In the present embodiment, the optimization objective may be the average product-yield of the small plates, may also be the sum of the completed quantities of the finished product, or may further be a combined optimization objective formed thereby. It should be appreciated that, when the average product-yield of the small plates is taken as the optimization objective, the obtained layout mode can achieve a higher overall product-yield of the plate; when the sum of the completed quantities of the finished product is taken as the optimization objective, the finished product can be completed as much as possible in the actual production process of the plate; and when the combined optimization objective is formed by the aforementioned objectives, the product-yield and the completed quantity of the finished product can be balanced well, and the total production cost is reduced.

Another embodiment of the present invention further discloses a production optimization method for nesting and shear cutting of a defective plate. The plate comprises small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate; the decision variables include $x_i^j$ and $z_j$, wherein $z_j$ represents whether the demand quantity of the finished product specification j is completed, and if completed, the variable is taken as 1, otherwise, it is taken as 0; and the optimization objectives include the average product-yield of the small plates and the sum of the completed quantities of the finished product; the average product-yield of the small plates is set as a first optimization objective:

$$\max obj1 = (\frac{1}{m}\sum_{i=1}^{m}\frac{\sum_{j=1}^{n}x_i^j w_j}{W_i}), \tag{7}$$

wherein $w_j$ is the width of the finished product, and $W_i$ is the width of the small plate;

the sum of the completed quantities of the finished production is set as a second optimization objective:

$$\max obj2 = \sum_{j=1}^{n}z_j; \tag{8}$$

and the optimization objective is obtained by weight summing the first optimization objective and the second optimization objective.

In the present embodiment, the first optimization objective and the second optimization objective are combined and weight summed to obtain the optimization objective according to a certain proportion, so that the product-yield and the completed quantities of the finished product can be better balanced, and the total production cost is reduced. In one embodiment, whether the demand quantity of the finished product specification j is completed may be determined by calculating whether the residual demand quantity is greater than 0. It should be appreciated that, the respective weights of the two optimization objectives can be adjusted according to the parameter information, the importance, and the like. For example, in one embodiment, a weight ratio of obj1 with respect to obj2 may be 2:1, 3:1 and the like. Without being bound to the embodiment, the weights of obj1 and obj2 may be other values in other embodiments.

Another embodiment of the present invention further discloses a production optimization method for nesting and shear cutting of a defective plate. The parameter information includes a length of the small plate. The production optimization method for nesting and shear cutting of a defective plate further comprises the following steps: issuing control instruction according to the electronic defect map, the parameter information and the layout mode; and performing nesting and shear cutting on the plate according to the control instruction.

In the present embodiment, the dimension of the plate and the position and size of each small plate on the plate can be determined from the electronic defect map and the parameter information. Taking the process that the plate is shear cut into small plates along the width direction of the plate during plate processing, and then each small plate is cut into finished strips along the length direction of the plate as an example, the positions that need to use a transverse cutting device, such as a shear, in the length direction of the plate in the actual production process may be determined at this time, so as to cut the plate into various small plates along the width direction of the plate, and thus a transverse cutting solution of the plate is obtained. When processing each small plate, the positions that need to use a longitudinal cutting device, such as blades, in the width direction of the plate may be determined according to the electronic defect map and the layout modes of each small plate, so as to cut the small plates into finished strips corresponding to finished product in the length direction of the plate, and thus, a longitudinal-cutting blade assembling solution for each small plate is obtained, which further determine a nesting and shear cutting solution for the whole plate. At this point, control instruction corresponding to the nesting and shear cutting solution for the plate is issued, and then transverse cutting or longitudinal cutting is sequentially completed at corresponding positions of the plate according to the control instruction.

According to the embodiment, the integral nesting and shear cutting solution for the plate is determined before the plate is processed, which facilitates the use of the device in the plate processing process, and improves the production efficiency of the plate in the actual processing process.

The plate is set to comprise small plates of a number m indexed by i, wherein i=1, 2, . . . , m; the products to be processed have finished product specifications in total of a number n indexed by j, wherein j=1, 2, . . . , n; a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate.

In one embodiment, the plate is a silicon steel plate with a width of 1100 millimeters and a length of 2000 meters, and the corresponding defect information is shown in Table 1 in the foregoing embodiment. The primitive defects on the plate can be determined according to Table 1, and then the plate and the defects are digitized to make an electronic defect map. Referring to FIG. 5 to FIG. 6, in the embodiment, the plate is partitioned into four regions, namely a WS side (working side), a central WS side (central working side), a central DS side (central driving side), and a DS side (driving side) along the width direction (X direction shown in FIG. 5 to FIG. 6). Along a length direction (Y direction shown in FIG. 5 and FIG. 6) of the plate, a blade assembling place during actual processing of the plate is set as a starting point, that is, the 0-meter position in length. In other embodiments, the defects may be located by other methods. The plate has 9 primitive defects, which are unacceptable for the products to be processed. Referring to FIG. 6, 9 primitive defects according to Table 1 are shown, and a corresponding electronic defect map is obtained according to the plate dimension information, and a region corresponding to each defect is illustrated with reference to the shaded portion in FIG. 6. The present embodiment has a minimum coiling length of 500 meters. The primitive defect 2 and the primitive defect 3 are merged into a customized defect along the length direction of the plate, then the plate is partitioned into two small plates C1 and C2 along dotted lines c1, c2, c3 and c4 according to the primitive defects and the customized defect.

In particular, small plate C1 has a length=950−150=800 meters, and small plate C2 has a length=1820−1000=820 meters. In the present embodiment, a margin default value s is set to be 20 millimeters, and the requirement on the reserved widths of the two sides of each small plate is calculated as follows: the requirement of the working side of small plate C1=margin default value s=20 millimeters; and the requirement of the driving side of small plate C1=max{margin default value s, wDS 1}=max {20,70}=70 millimeters. The requirement of the working side of small plate C2=max{margin default value s, wDS 2}=max{20, 60}=60 millimeters; and the requirement of the driving side of small plate C2=max {margin default value s, wDS 2}=max{20,40}=40 millimeters.

In the present embodiment, the product to be processed is a transformer which has 18 kinds of finished product specifications in total, and the corresponding specification information is shown in Table 3 in the foregoing embodiment. The present embodiment adopts a minimum product-yield P=80%, a constant value M=1000000, and the residual demand quantity of each finished product is $$y_j: \ y_j = l_j(1 - e_j) - \sum_{i=1}^{m} x_i^j L_i, \ j = 1,2, \ldots , n;$$

$z_j$ is set to be a binary variable representing whether the demand quantity of the finished product specification j in the product to be processed is completed. If the demand quantity of the finished product specification j in the product to be processed is completed, $z_j$ is taken as 1, and if the demand quantity of the finished product specification j in the products to be processed is not completed, $z_j$ is taken as 0; and a model is established and solved to obtain a layout vector $X_i = x_i^1, x_i^2, \ldots, x_i^j, \ldots, x_i^n$) of each small plate satisfying the following constraints and optimization objective:

$$\max\left(\frac{1}{m}\sum_{i=1}^{m}\frac{\sum_{j=1}^{n}x_i^j w_j}{W_i} + \sum_{j=1}^{n}z_j\right)$$

s.t.

$$\sum_{j=1}^{n}x_j^j w_j + \max\{w_j^{WS}, s\} + \max\{w_i^{DS}, s\} \le W_i,$$

$$\sum_{i=1}^{m}x_i^j L_i \le l_j(1 + e_j), \ j = 1,2, \ldots , n,$$

$$\frac{\sum_{j=1}^{n}x_i^j w_j}{W_i} \ge P,$$

$$y_j = l_j(1 - e_j) - \sum_{i=1}^{m}x_i^j L_i, \ j = 1,2, \ldots , n,$$

$$M(1 - z_j) \ge y_j \ge N(1 - z_j) - Mz_j, \ j = 1,2, \ldots , n,$$

wherein $w_j$ is the width of finished product, $w_i^{WS}$ is the maximum defect width on the working side of small plate, $w_i^{DS}$ is the maximum defect width on the driving side of small plate, $W_i$ is the width of small plate, s is the margin default value, $L_i$ is the length of small plate, $l_j$ is the demand quantity of the finished product, $e_j$ is the demand tolerance of the finished product, N is the minimum coiling length, and N=500 meters.

In the embodiment, the average product-yield of the small plates is taken as a first optimization objective, while the sum of the completed quantity of the finished product is taken as a second optimization objective. The two objectives are weighted in a ratio of 1:1 and are combined to form an optimization objective. After solving, the following can be obtained:

$$X_1=(x_1^1, x_1^2, \ldots, x_1^j, \ldots, x_1^{18})=\\ [010000000000000101];$$

$$X_2=(x_2^1, x_2^2, \ldots, x_2^j, \ldots, x_2^{18})=\\ [010000000100000000].$$

Therefore, the obtained nesting and shear cutting solution for the silicon steel plate is as follows:

(1) Transverse cutting solution: the plate is transversely shear cut at the position of 150 meters, 950 meters, 1000 meters and 1820 meters, respectively, and thus, the plate is partitioned into a small plate C1 and a small plate C2.

(2) Longitudinal-cutting blade assembling solution: the blade assembling solution of small plate C1: 580+220+205 (namely, finished product specifications 2, 16 and 18 are nested together), the sum width=1005 millimeters, and the product-yield=91.36%; the blade assembling solution of small plate C2: 580+420 (namely, finished product specifications 2 and 10 are nested together), the sum width=1000 millimeters, and the product-yield=90.91%; completion statistics of finished products: the demand quantity of finished product specification 2 is completed.

Then, control instruction is issued according to the solution so as to complete nesting and shear cutting process of the silicon steel plate.

The production optimization method above enables a high average product-yield of the silicon steel plate, and greatly reduce the scrap rate of the silicon steel plate. Additionally, more finished product can be completed, and the residual demand quantity of all uncompleted finished product are greater than the minimum coiling length, facilitating the production of the products to be processed. The solution of the whole plate is planned according to the optimization objective at first, then practical processing is performed, which provide high scientificity, lower production cost and improve the production efficiency.

Another embodiment of the present invention further discloses a preprocessing system for nesting and shear cutting of a defective plate, comprising: a processing unit for processing the plate by any one of the preprocessing methods for nesting and shear cutting of a defective plate in the foregoing embodiments. The processing unit may be a computer, a single chip microcomputer, a mobile terminal, a server and other units that have data processing function.

By utilizing the above technical solution, the preprocessing system for nesting and shear cutting of a defective plate can reduce the scrap rate in plate processing.

Optionally, the preprocessing system further includes a display unit, and the display unit displays a schematic diagram of the preprocessed plate, so that manufacturers can conveniently check the defects.

Another embodiment of the present invention further discloses a layout system for nesting and shear cutting of a defective plate, comprising: a processing unit for processing the plate by any one of the layout methods for nesting and shear cutting of a defective plate in the foregoing embodiments.

By utilizing the above technical solution, the layout mode of each small plate can be obtained by the layout system for defective plates, which facilitates processing production of the plate. That is, a blade assembling mode in a production process may be determined according to the layout vector so as to carry out the subsequent nesting and shear cutting.

Another embodiment of the present invention further discloses a production optimization system for nesting and shear cutting of a defective plate, comprising: a processing unit for processing the plate by the production optimization method for nesting and shear cutting of a defective plate in the foregoing embodiments; a control unit for receiving the solution transmitted from the processing unit, and issuing control instruction according to the solution; and a production apparatus for receiving the control instruction, and performing nesting and shear cutting to the plate according to the control instruction.

By utilizing the above technical solution, the production efficiency in the plate processing process is improved by the production optimization system for nesting and shear cutting of a defective plate.

Another embodiment of the present invention further discloses a computing device, comprising: a processor for implementing various instructions; and a memory for storing a plurality of instructions for the processor to load and execute any one of the preprocessing methods for nesting and shear cutting of a defective plate in the foregoing embodiments.

Another embodiment of the present invention further discloses a computing device, comprising: a processor for implementing various instructions; and a memory for storing a plurality of instructions for the processor to load and execute any one of the layout methods for nesting and shear cutting of a defective plate in the foregoing embodiments.

Another embodiment of the present invention further discloses a computing device, comprising: a processor for implementing various instructions; and a memory for storing a plurality of instructions for the processor to load and execute any one of the production optimization methods for nesting and shear cutting of a defective plate in the foregoing embodiments.

Another embodiment of the present invention further discloses a storage medium, wherein the storage medium stores a plurality of instructions for the processor to load and execute any one of the preprocessing methods for nesting and shear cutting of a defective plate in the foregoing embodiments.

Another embodiment of the present invention further discloses a storage medium, wherein the storage medium stores a plurality of instructions for the processor to load and execute any one of the layout methods for nesting and shear cutting of a defective plate in the foregoing embodiments.

Another embodiment of the present invention further discloses a storage medium, wherein the storage medium stores a plurality of instructions for the processor to load and execute any one of the production optimization methods for nesting and shear cutting of a defective plate in the foregoing embodiments.

The embodiments disclosed by the present application may be implemented in hardware, software, firmware, or a combination thereof. The embodiments of the present application may be implemented as computer programs or program codes executing on programmable systems including at least one processor, a storage system (including volatile and non-volatile memories and/or storage elements), at least one input device, and at least one output device. The program codes may be applied to input instructions to perform the functions described in the present application and generate output information. The output information may be applied to one or more output devices in a known manner. For purposes of the present application, a processing system includes any system having a processor such as a digital signal processor (DSP), a microcontroller, an application specific integrated circuit (ASIC), or a microprocessor.

The program codes may be implemented in a high-level procedural language or object-oriented programming language to communicate with a processing system. The program codes may also be implemented in assembly language or machine language, if desired. In fact, mechanisms described in the present application are not limited in scope of any particular programming language. In any case, the language may be a compiled or interpreted language.

In some cases, the disclosed embodiments may be implemented in hardware, firmware, software, or any combination thereof. The disclosed embodiments may also be implemented as instructions carried by or stored on one or more transitory or non-transitory machine-readable (for example, computer-readable) storage media, and the instructions may be read and executed by one or more processors. For example, the instructions may be distributed via a network or via other computer-readable media. Thus, the machine-readable medium may include any mechanism for storing or transmitting information in a machine-readable (for example, computer-readable) form, including, but not limited to, a floppy disk, an optical disk, a compact disk, a compact disc read-only memory (CD-ROM), a magneto-optical disk, a read-only memory (ROM), a random access memories (RAM), an erasable programmable read-only memory (EPROM), an electrically erasable programmable read-only memory (EEPROM), a magnetic or optical card, a flash memory, or a tangible machine-readable memory for transmitting information (for example, carrier waves, infra-red signal digital signals, and the like) using the internet in the form of electricity, light, sound or other forms of propagated signals. Thus, a machine-readable medium includes any type of machine-readable medium suitable for storing or transmitting electronic instructions or information in a machine (for example, a computer)-readable form.

In the drawings, some structure or method features may be shown in a particular arrangement and/or order. However, it is to be appreciated that such specific arrangement and/or ordering may not be required. Rather, in some embodiments, the features may be arranged in a manner and/or order different from that shown in the illustrative figures. In addition, the structure or method features included in a particular figure are not intended to imply that such features are required in all embodiments, and in some embodiments may not be included or may be combined with other features.

It should be noted that, each module/unit mentioned in each device embodiment of the present application is a logical module/unit, and physically, one logical module/unit may be one physical module/unit, or a part of one physical module/unit, or may be implemented by a combination of multiple physical modules/units. The physical implementation manner of the logical module/unit itself is not the most important, and the combination of the functions implemented by the logical module/unit is the key to solve the technical problem proposed by the present application. Furthermore, in order to highlight the inventive part of the present application, the above device embodiments of the present application do not introduce modules/units which are not so closely related to solve the technical problems proposed by the present application, which does not indicate that there are no other modules/units in the above device embodiments.

Although the present invention has been illustrated and described with reference to certain preferred embodiments of the present invention, it will be understood by those of ordinary skill in the art that the further detail description is made to the present application in combination with the specific embodiments, and the specific embodiments of the present invention are not to be construed as being limited thereto. Various changes in form and detail, including simple deductions or substitutions, may be made by those skilled in the art without departing from the spirit and scope of the present invention.

What is claimed is:

1. A layout method for nesting and shear cutting of a defective plate comprising the following steps:

acquiring specification information of each finished product for products to be processed;

acquiring parameter information of each small plate;

setting decision variables relating to layout modes of each small plate, and establishing constraints among the decision variables, the specification information and the parameter information; and finding out layout modes for each small plate that satisfies the constraints;

wherein the specification information includes a width of finished product; and wherein the parameter information includes a width of small plate, a maximum defect width on the working side of small plate and a maximum defect width on a driving side of small plate; and wherein the decision variables include strip number of each finished product on each small plate, and the constraints include a first constraint corresponding to the width of small plate; and wherein the layout method further comprises a preprocessing method that comprises the following steps:

acquiring plate information of the plate, wherein the plate information includes defect information and plate dimension information;

making an electronic defect map based on the defect information and the plate dimension information, and partitioning out a region available for nesting and shear cutting; and partitioning the plate to obtain small plates according to the region available for nesting and shear cutting.

2. The layout method for nesting and shear cutting of a defective plate according to claim 1, wherein the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, . . . , x_i^j, . . . , x_i^n)$, wherein $x_i^j$ represents the strip number of finished product specification j on the $i^{th}$ small plate, and wherein the decision variables comprise the $x_i^j$; and wherein the first constraint comprises:

$$\sum_{j=1}^{n} x_i^j w_j + w_i^{WS} + w_i^{DS} \le W_i, i = 1,2, ... , m, \tag{1}$$

wherein $w_j$ is the width of finished product, $w_i^{WS}$ is the maximum defect width on the working side of small plate, $w_i^{DS}$ is the maximum defect width on the driving side of small plate, and $W_i$ is the width of small plate.

3. The layout method for nesting and shear cutting of a defective plate according to claim 2, wherein the parameter information further includes a margin default value, and the first constraint further comprises:

$$\sum_{j=1}^{n} x_i^j w_j + \max\{w_i^{WS}, s\} + \max\{w_i^{DS}, s\} \le W_i, i = 1,2, ... , m, \tag{2}$$

wherein $w_j$ is the width of finished product, $w_i^{WS}$ is the maximum defect width on the working side of small plate, $w_i^{DS}$ is the maximum defect width on the driving side of small plate, $W_i$ is the width of small plate, and s is the margin default value.

4. The layout method for nesting and shear cutting of a defective plate according to claim 1, wherein the specification information further includes a demand quantity of finished product and a demand tolerance of finished product; and wherein the parameter information further includes a length of small plate; and wherein the constraints further include a second constraint corresponding to the demand quantity of finished product.

5. The layout method for nesting and shear cutting of a defective plate according to claim 4, wherein the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, . . . , x_i^j, . . . , x_i^n)$, wherein $x_i^j$ represents the strip number of finished product specification j on the $i^{th}$ small plate, and wherein the decision variables comprise the $x_i^j$; and wherein the second constraint comprises:

$$\sum_{i=1}^{m} x_i^j L_i \le l_j(1+e_j), \ j=1,2, \ldots, n, \tag{3}$$

wherein $L_i$ is the length of small plate, $l_j$ is the demand quantity of finished product, and $e_j$ is the demand tolerance of finished product.

6. The layout method for nesting and shear cutting of a defective plate according to claim 4, wherein the parameter information further includes a minimum coiling length of a production apparatus for the plate, the decision variables further include a residual demand quantity of finished product and a completion quantity of finished product, and the constraints further include a fourth constraint corresponding to the minimum coiling length.

7. The layout method for nesting and shear cutting of a defective plate according to claim 6, wherein the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and the decision variables include $x_i^j$, $y_j$ and $z_j$; and wherein the layout method for nesting and shear cutting of a defective plate further comprises the following steps:

setting $y_j$ as real variable representing the residual demand quantity of the finished product specification j; setting $z_j$ as binary variable representing whether the demand quantity of the finished product specification j is completed, and if completed, the variable is taken as 1, otherwise, it is taken as 0; and setting M as a constant value, wherein M≥max {$l_1$, $l_2$, . . . , $l_n$};

and wherein the fourth constraint comprises:

$$y_j = l_j(1-e_j) - \sum_{i=1}^{m} x_i^j L_i, \ j=1,2, \ldots, n, \tag{5}$$

wherein $L_i$ is the length of small plate, $l_j$ is the demand quantity of finished product, and $e_j$ is the demand tolerance of finished product; and $$M(1-z_j) \ge y_j \ge N(1-z_j) - M z_j, j=1,2, \ldots, n \tag{6}$$

wherein N is the minimum coiling length.

8. The layout method for nesting and shear cutting of a defective plate according to claim 1, wherein the parameter information further includes a product-yield, and the constraints further include a third constraint corresponding to the product-yield of each small plate.

9. The layout method for nesting and shear cutting of a defective plate according to claim 8, wherein the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate, and the decision variables comprise the $x_i^j$; and wherein the product-yield includes a minimum product-yield, and the third constraint comprises:

$$\frac{\sum_{j=1}^{n} x_i^j w_j}{W_i} \ge P, \ i=1,2, \ldots, m, \tag{4}$$

wherein P is the minimum product-yield, $w_j$ is the width of finished product, and $W_i$ is the width of small plate.

10. The layout method for nesting and shear cutting of a defective plate according to claim 1, wherein the plate is a silicon steel plate.

11. The layout method for nesting and shear cutting of a defective plate according to claim 1, wherein the defect information comprises defects of folds, holes, edge damage, frost descents, spots, indentations, and stripes.

12. The layout method for nesting and shear cutting of a defective plate according to claim 1, wherein the step of making the electronic defect map based on the defect information and the plate dimension information, and partitioning out the region available for nesting and shear cutting comprises:

obtaining all non-edge defects based on the defects;

computing distances between every two adjacent non-edge defects along a length direction of the plate; and merging any two adjacent non-edge defects into a customized defect along the length direction when their distance is lower than or equal to a predetermined distance threshold.

13. A production optimization method for nesting and shear cutting of a defective plate, wherein the production optimization method comprises the layout method for nesting and shear cutting of a defective plate according to claim 1, and wherein the step of finding out the layout modes of each small plate that satisfies the constraint further comprises:

setting optimization objectives for nesting and shear cutting of the plate;

establishing a model for nesting and shear cutting of the plate based on the decision variables, the constraints and the optimization objectives; and solving the model to obtain the layout modes.

14. The production optimization method for nesting and shear cutting of a defective plate according to claim 13, wherein the optimization objectives include an average product-yield of small plates, and a sum of the completed quantities of finished product.

15. The production optimization method for nesting and shear cutting of a defective plate according to claim 14, wherein the plate comprises small plates of a number m indexed by i, wherein i=1, 2, . . . , m; and wherein the products to be processed have finished product specifications in total of a number n indexed by j, wherein j=1, 2, . . . , n; and wherein a layout vector of the $i^{th}$ small plate is set as $X_i=(x_i^1, x_i^2, \ldots, x_i^j, \ldots, x_i^n)$, wherein $x_i^j$ represents the strip number of finished product specification j on the $i^{th}$ small plate; and wherein the decision variables include $x_i^j$ and $z_j$, wherein $z_j$ represents whether the demand quantity of the finished product specification j is completed, and if completed, the variable is taken as 1, otherwise, it is taken as 0; and wherein the optimization objectives include an average product-yield of small plates and a sum of the completed quantities of finished products; and wherein the average product-yield of small plates is set as a first optimization objective:

$$\max obj1 = \left(\frac{1}{m}\sum_{i=1}^{m}\frac{\sum_{j=1}^{n}x_i^j w_j}{W_i}\right), \tag{7}$$

wherein $w_j$ is the width of finished product, and $W_i$ is the width of small plate;

the sum of the completed quantities of finished products is set as a second optimization objective:

$$\max obj2 = \sum_{j=1}^{n}z_j; \tag{8}$$

and the optimization objective is obtained by weight summing the first optimization objective and the second optimization objective.

16. The production optimization method for nesting and shear cutting of a defective plate according to claim 13, wherein the parameter information includes a length of small plate, and the production optimization method for nesting and shear cutting of a defective plate further comprises the following steps:

issuing control instruction according to the electronic defect map, the parameter information and the layout mode; and performing nesting and shear cutting on the plate according to the control instruction.

17. A layout system for nesting and shear cutting of a defective plate, comprising:

a processor for processing the plate by the layout method for nesting and shear cutting of a defective plate according to claim 1.

18. A production optimization system for nesting and shear cutting of a defective plate, comprising:

a processor used for a solution which uses the production optimization method for nesting and shear cutting of a defective plate according to claim 13 to obtain small plates;

a controller for receiving the solution transmitted from the processing unit and issuing control instruction according to the nesting solution; and a cutting apparatus for receiving the control instruction and performing nesting and shear cutting on the plate according to the control instruction.

19. A computing device, comprising:

a processor for implementing various instructions; and a memory for storing a plurality of instructions for the processor to load and execute the layout method for nesting and shear cutting of a defective plate according to claim 1.

20. A computing device, comprising:

a processor for implementing various instructions; and a memory for storing a plurality of instructions for the processor to load and execute the production optimization method for nesting and shear cutting of a defective plate according to claim 13.

21. A non-transitory machine-readable storage medium, wherein the non-transitory machine-readable storage medium stores a plurality of instructions for the processor to load and execute the layout method for nesting and shear cutting of a defective plate according to claim 1.

22. A non-transitory machine-readable storage medium, wherein the non-transitory machine-readable storage medium stores a plurality of instructions for the processor to load and execute the production optimization method for nesting and shear cutting of a defective plate according to claim 13.

\* \* \* \* \*